Jan. 3, 1956  I. L. WILCOX ET AL  2,729,379
BOTTLE CAPPING MACHINE

Filed Sept. 29, 1950 11 Sheets-Sheet 2

INVENTOR.
ISAAC L. WILCOX &
NATHANIEL S. COLE
BY Bodell + Thompson
ATTORNEYS

Jan. 3, 1956

I. L. WILCOX ET AL 2,729,379

BOTTLE CAPPING MACHINE

Filed Sept. 29, 1950

INVENTOR.
ISAAC L. WILCOX &
NATHANIEL S. COLE
BY Bodell & Thompson
ATTORNEYS

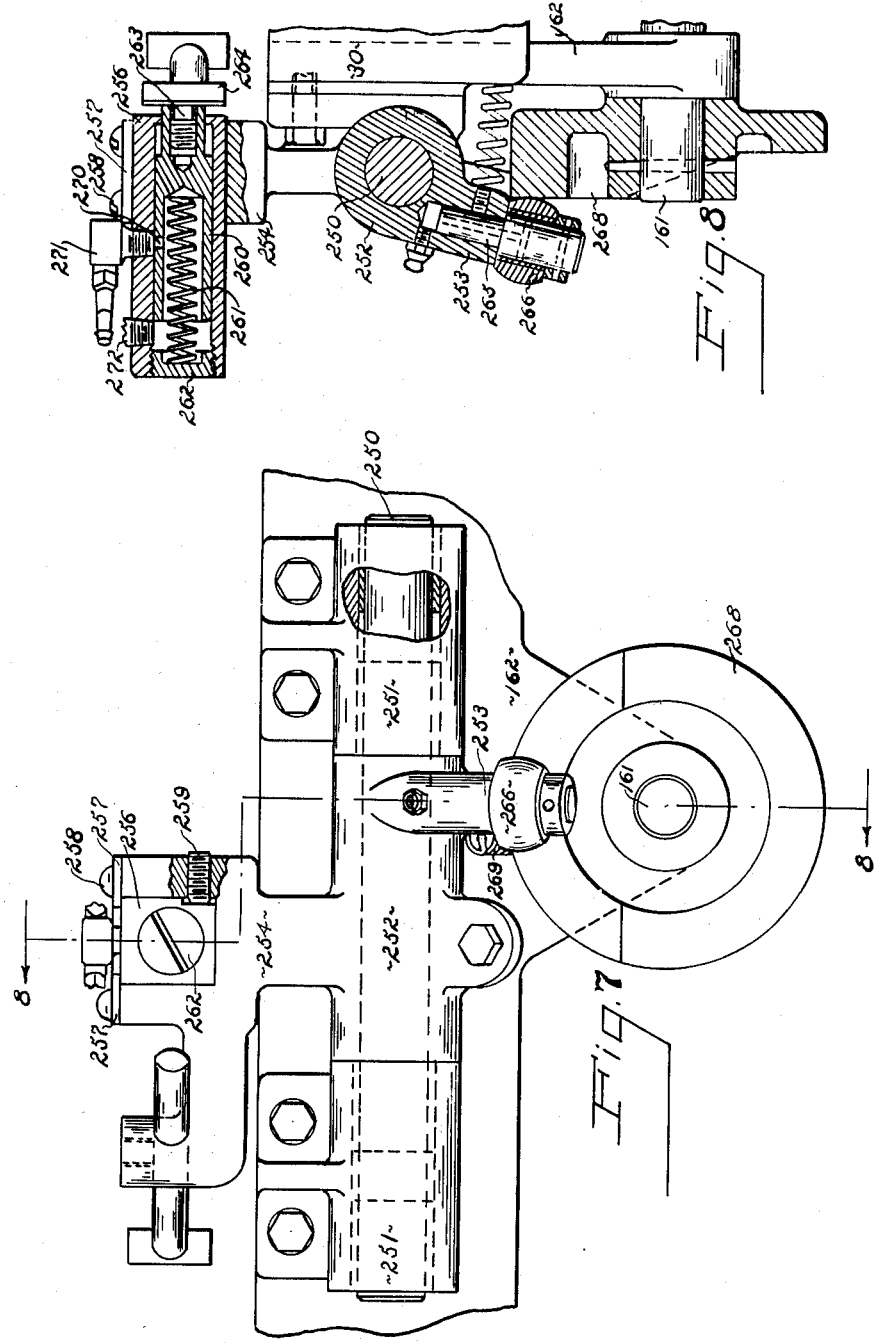

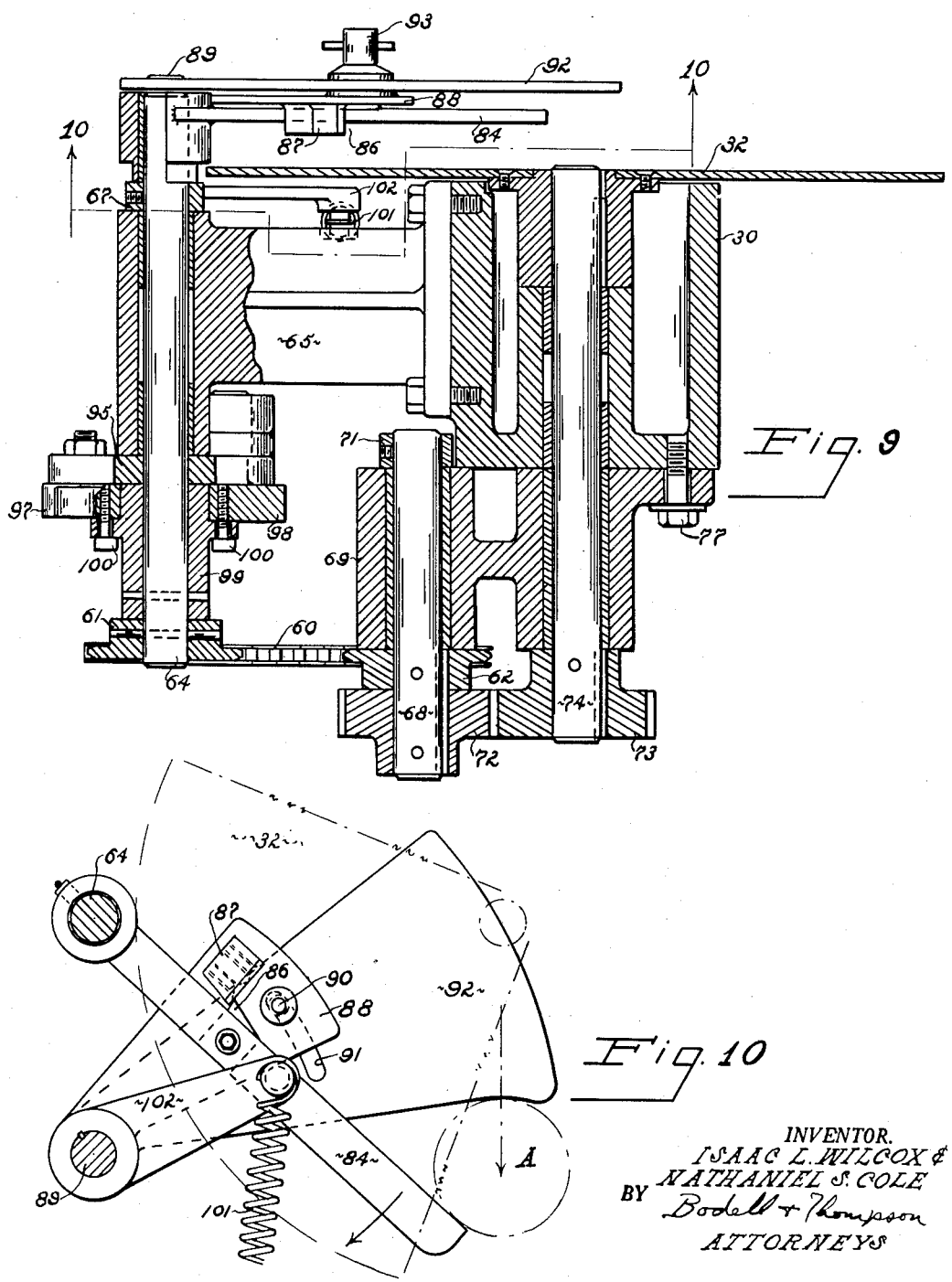

Jan. 3, 1956     I. L. WILCOX ET AL     2,729,379
BOTTLE CAPPING MACHINE

Filed Sept. 29, 1950     11 Sheets-Sheet 10

INVENTOR.
ISAAC L. WILCOX &
NATHANIEL S. COLE
BY Bodell & Thompson
ATTORNEYS

Jan. 3, 1956     I. L. WILCOX ET AL     2,729,379
BOTTLE CAPPING MACHINE
Filed Sept. 29, 1950     11 Sheets-Sheet 11
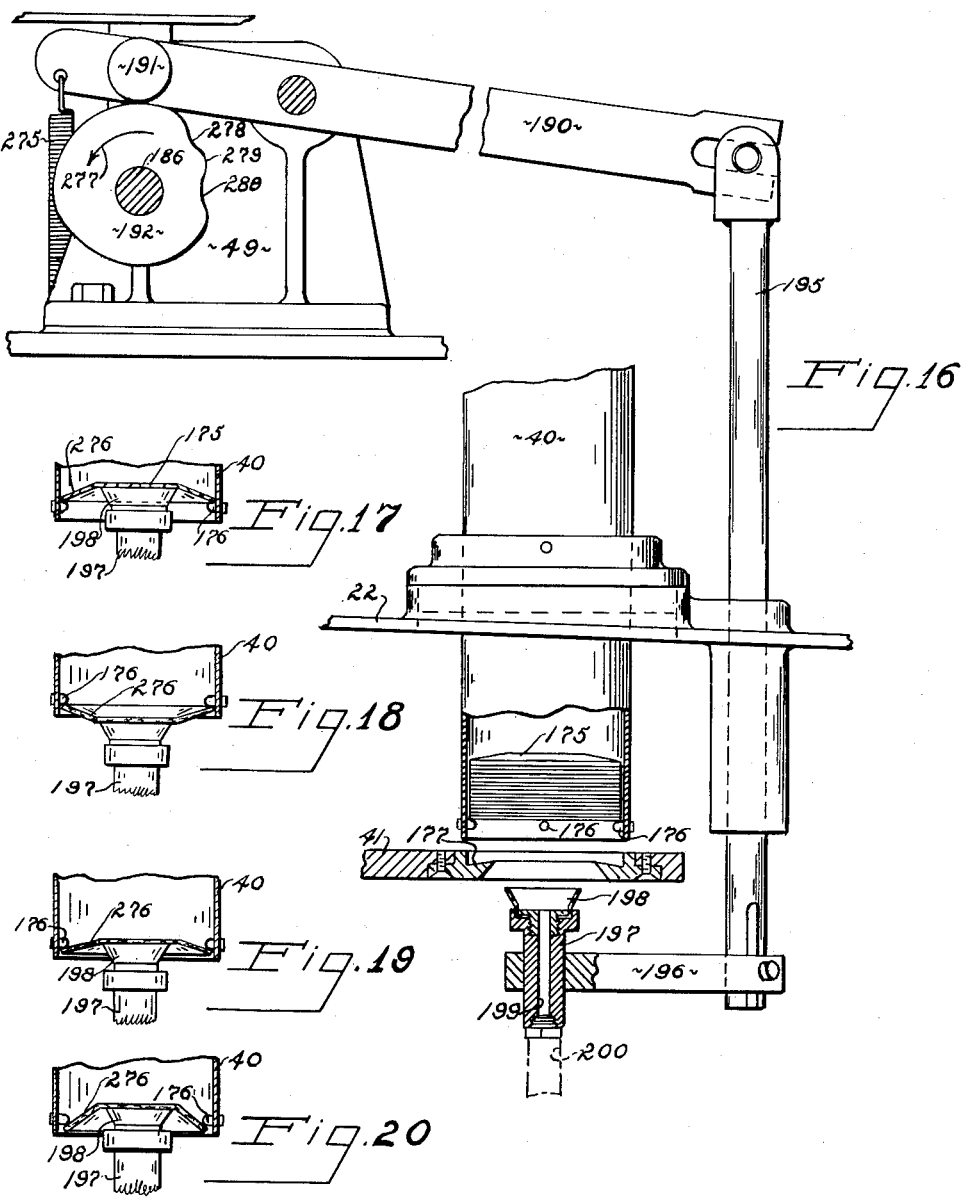
INVENTOR.
ISAAC L. WILCOX &
NATHANIEL S. COLE
BY Bodell + Thompson
ATTORNEYS United States Patent Office  
2,729,379  
Patented Jan. 3, 1956

2,729,379
BOTTLE CAPPING MACHINE

Isaac L. Wilcox, Fulton, and Nathaniel S. Cole, Baldwinsville, N. Y., assignors to Oswego Falls Corporation, Fulton, N. Y., a corporation of New York Application September 29, 1950, Serial No. 187,472

6 Claims. (Cl. 226—83)

This invention relates to bottle capping machines and more particularly to a machine for applying hood or cover-all caps to the tops of milk bottles.

The invention has as an object a capping machine embodying a particularly compact structure, economical to manufacture, making the machine particularly suited for operation in small dairy plants.

The invention has as a further object a cap transfer and feeding mechanism, permitting the caps to be manufactured with the skirt portions of the caps depending and the caps stacked in a supply magazine right side up.

The invention has as a further object a cap closing or sealing head wherein the cap contracting jaws are mounted for free independent movement radially of the bottle for contracting the skirt of the cap against the neck of the bottle regardless of any irregularities in the form or shape of the bottle.

Other objects and advantages of the machine will be apparent from the following description and the structures disclosed in the drawings.

The invention consists in the novel features and in the combinations and constructions hereinafter set forth and claimed.

In describing this invention, reference is had to the accompanying drawings in which like characters designate corresponding parts in all the views.

Figure 7 is an enlarged front elevational view of the bottle detecting mechanism.

Figure 8 is a sectional view taken on line 8—8, Figure 7.

Figure 9 is a sectional view taken on line 9—9, Figure 4.

Figure 10 is a view taken on line 10—10, Figure 9.

Figure 16 is an elevational view of the cap supplying magazine and mechanism for withdrawing the caps and depositing the same in the cap carrier, with the lower portion of the magazine, cap carrier and cap transfer, shown in section.

Figure 17 is a sectional view of the lower end of the cap magazine showing the cap transfer member in initial engagement with the lowermost cap in the magazine.

Figure 18 is a view, similar to Figure 16, showing the cap removed from the magazine.

Figure 19 is a view, similar to Figure 17, showing the cap transfer member moved upwardly to move the skirt of the withdrawn cap engaging the lower end of the magazine.

Figure 20 is a view, similar to Figure 19, showing the cap re-entered in the lower end of the magazine, with the skirt portion of the cap depending downwardly.

Figure 1:
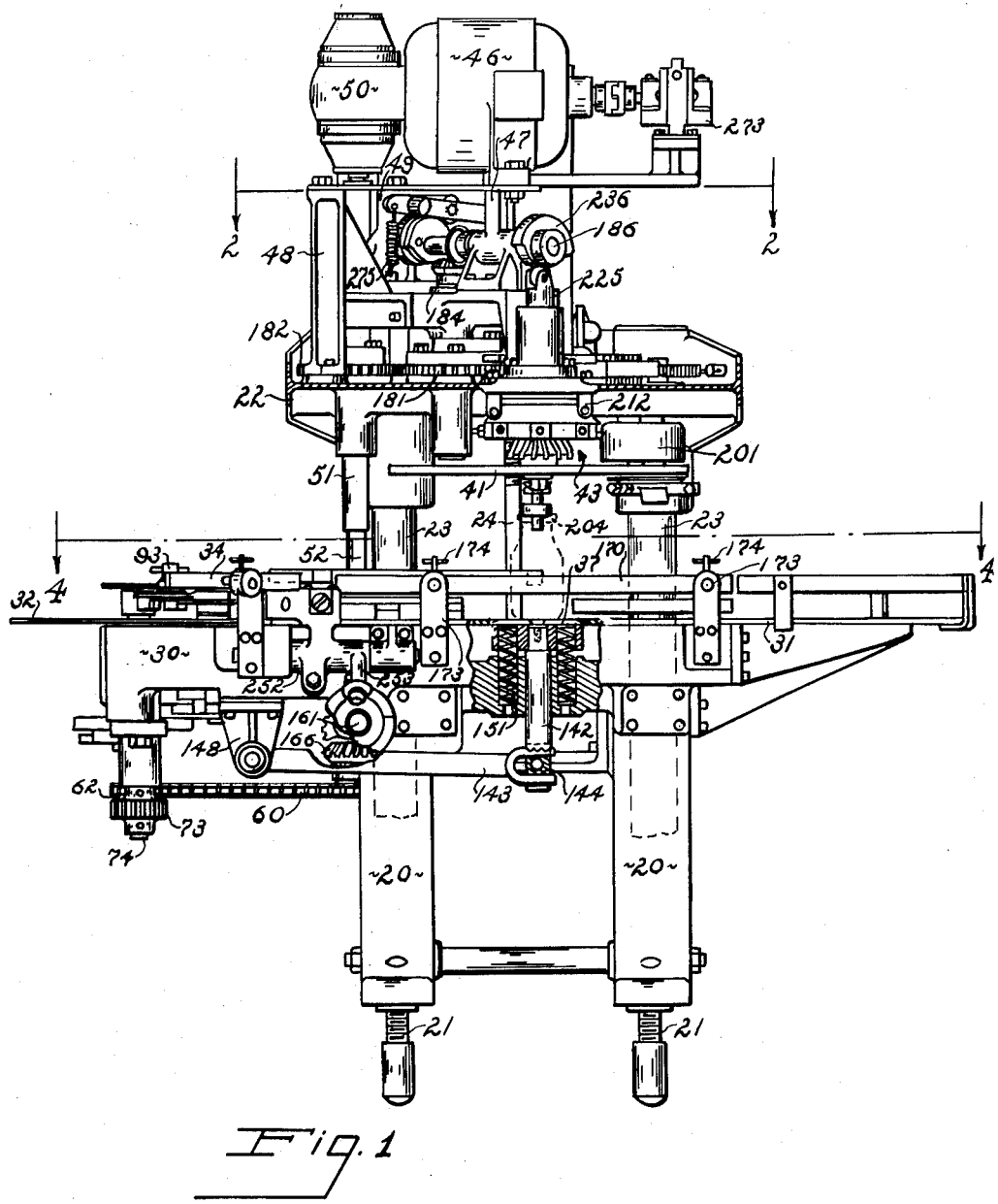
Figure 1 is a front elevational view of a capping machine embodying our invention, with parts broken away and parts shown in section.

The machine is supported upon a base member 20 having adjustable leg members 21. The cap supply magazine, cap heating and transfer mechanisms, and the cap applying head are mounted upon a frame or supporting member 22 carried by posts 23 extending upwardly from the base 20 in which they are slidably mounted. The supporting member 22 overhangs the base 20 and is adjusted vertically by means of a screw 24, the upper end of which is threaded into the support member 22, the screw being rotated by a hand wheel 25.

An elongated casting 30 is fixedly mounted on the base 20 and has affixed to its upper surface a plate 31 forming an elongated bottle guideway, along which the bottles are advanced below the supporting member 22. The bottles are initially positioned on a rotating in-feed table 32 which is rotated in the direction of the arrow 33, Figure 4, to move the bottles onto the guide plate 31 by means of guide rails 34, 35. The bottles are intermittently advanced along the guideway by a bottle advancing member 36 to a bottle elevator 37.

A tubular cap supply magazine 40 is mounted vertically in the support member 22 toward the rear side of the machine. The caps are successively withdrawn from the magazine and deposited upon a disk 41 which is rotated intermittently and which advances the caps in registration below a cap applying head designated generally 43. The head 43 is mounted in registration above the bottle elevator 37. As each bottle is positioned upon the elevator 37, a conditioned cap is positioned in registration between the top of the bottle and the applying head 43. The bottle is then moved upwardly by the elevator, removing the cap from the cap carrying disk 41 and moving it into the cap applying head which functions to apply the cap to the top of the bottle and contract the skirt of the cap about the neck of the bottle.

Figure 5:
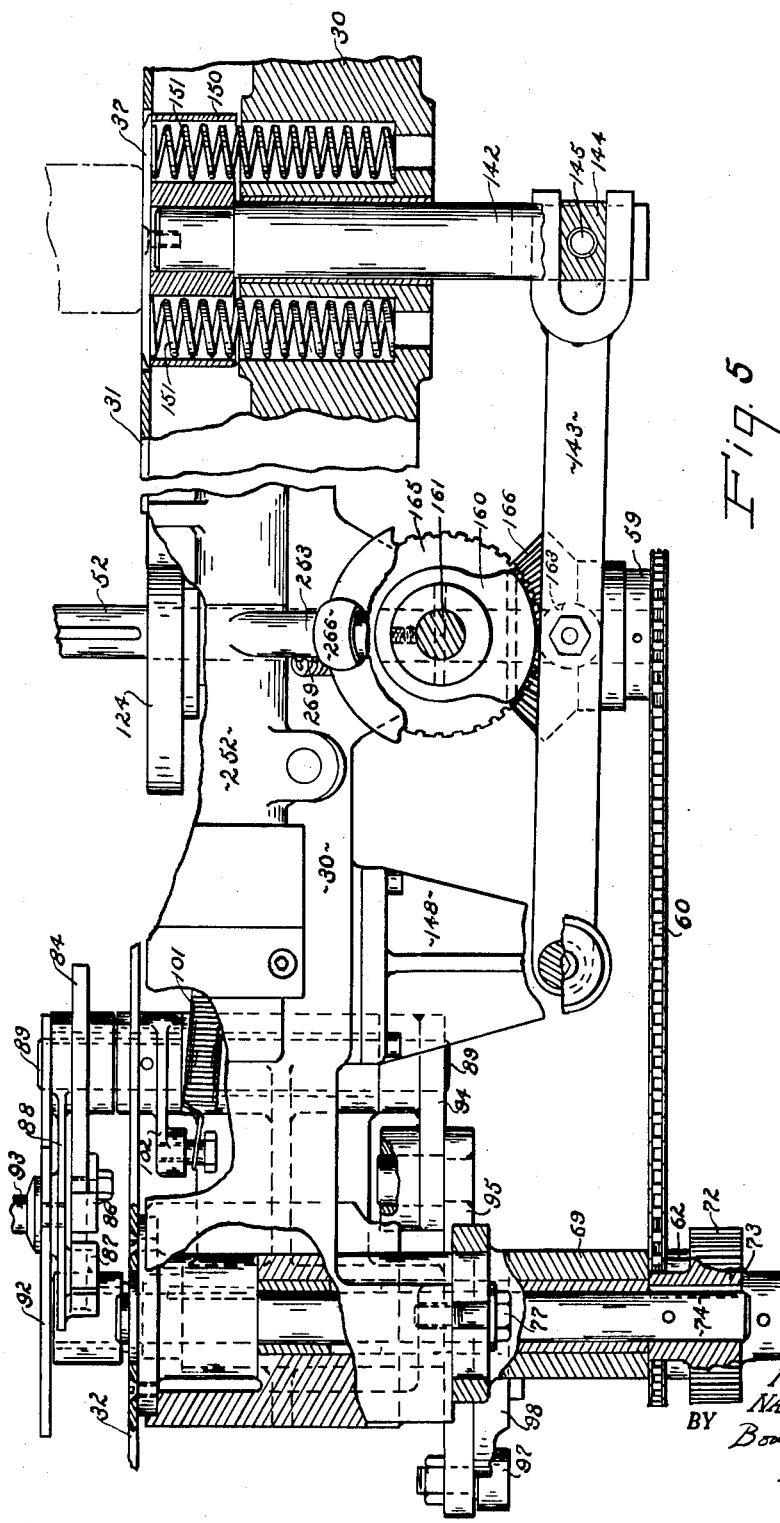
Figure 5 is a view taken on line 5—5, Figure 4.
Figure 6:
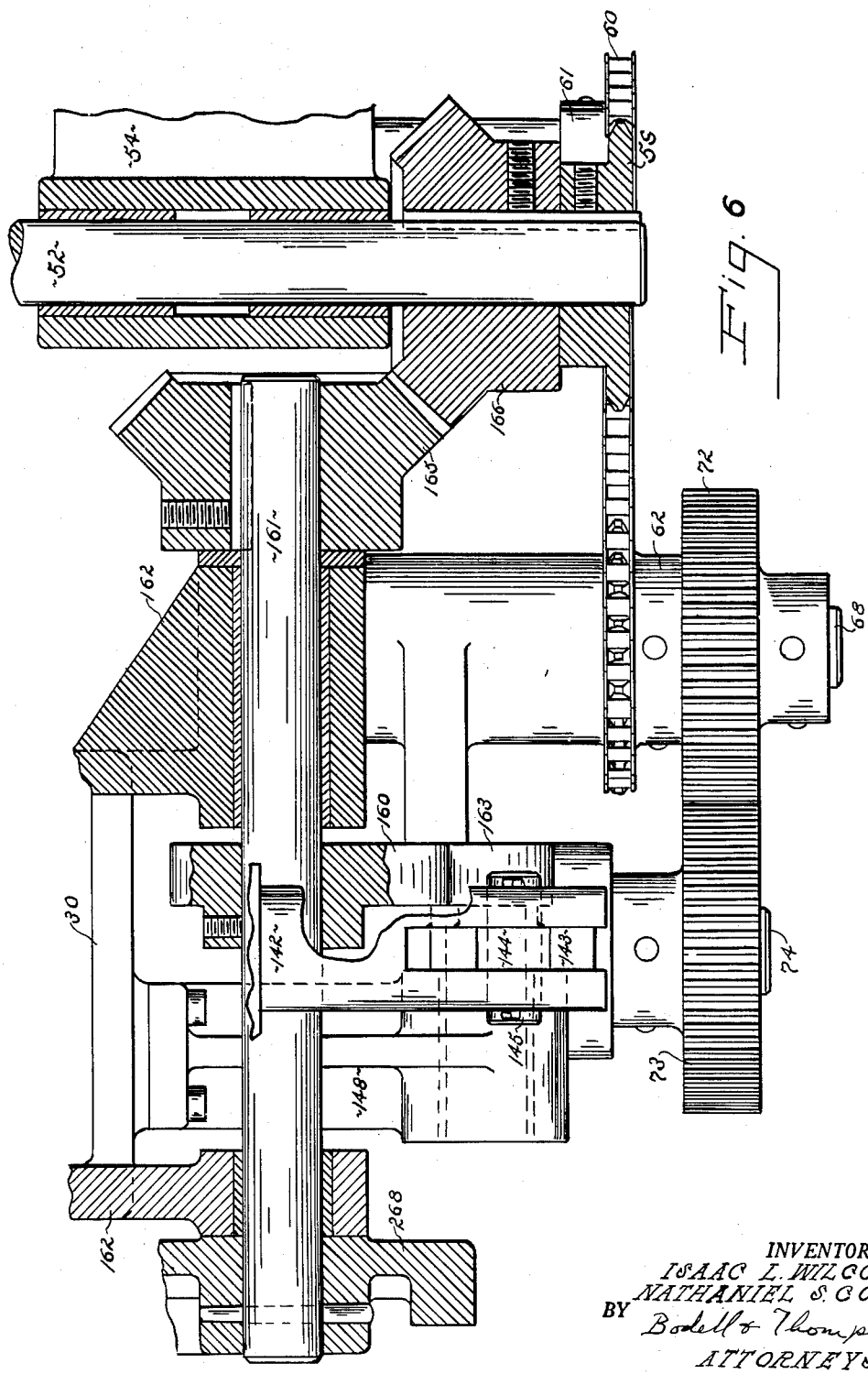
Figure 6 is a view taken on line 6—6, Figure 4.

The machine is operated by a motor 46 mounted upon brackets 47, 48 and 49, attached to the frame 22. The motor is provided with a self contained gear reduction 50 having a vertically arranged output shaft 51 extending downwardly through support 22 and connected at its lower end by a telescoping arrangement to a shaft 52 journalled in a bearing bracket 54 secured to the base 20. A sprocket 59 is secured to the lower end of the shaft 52. A driving chain 60 is trained over the sprocket 59 and also over sprockets 61, 62. The sprocket 61 is fixed to the lower end of a shaft 64 journalled in a bracket 65 secured to the casting 30 and extending rearwardly therefrom. The shaft 64 is retained in the bearing bracket 65 by a collar 67, see Figures 5, 6 and 9.

The sprocket 62 is fixed to a shaft 68 also journalled in a bracket 69 fixed to the under side of the casting 30, the shaft being retained against downward movement by a collar 71 and has affixed to its lower end a pinion 72 meshing with a gear 73. The gear is fixed to the lower end of a shaft 74 journalled in the bracket 69 and also in the casting 30, and to the upper end of the shaft 74 there is affixed the in-feed bottle table 32. The bearing bracket 69 is mounted for rotation about the shaft 74 and is fixedly secured to the casting 30 as by a clamping screw 77. The purpose of this adjustment is to properly tension the drive chain 60. With this arrangement, the shafts 64, 68 and 74 are rotated continuously.

Figure 4:
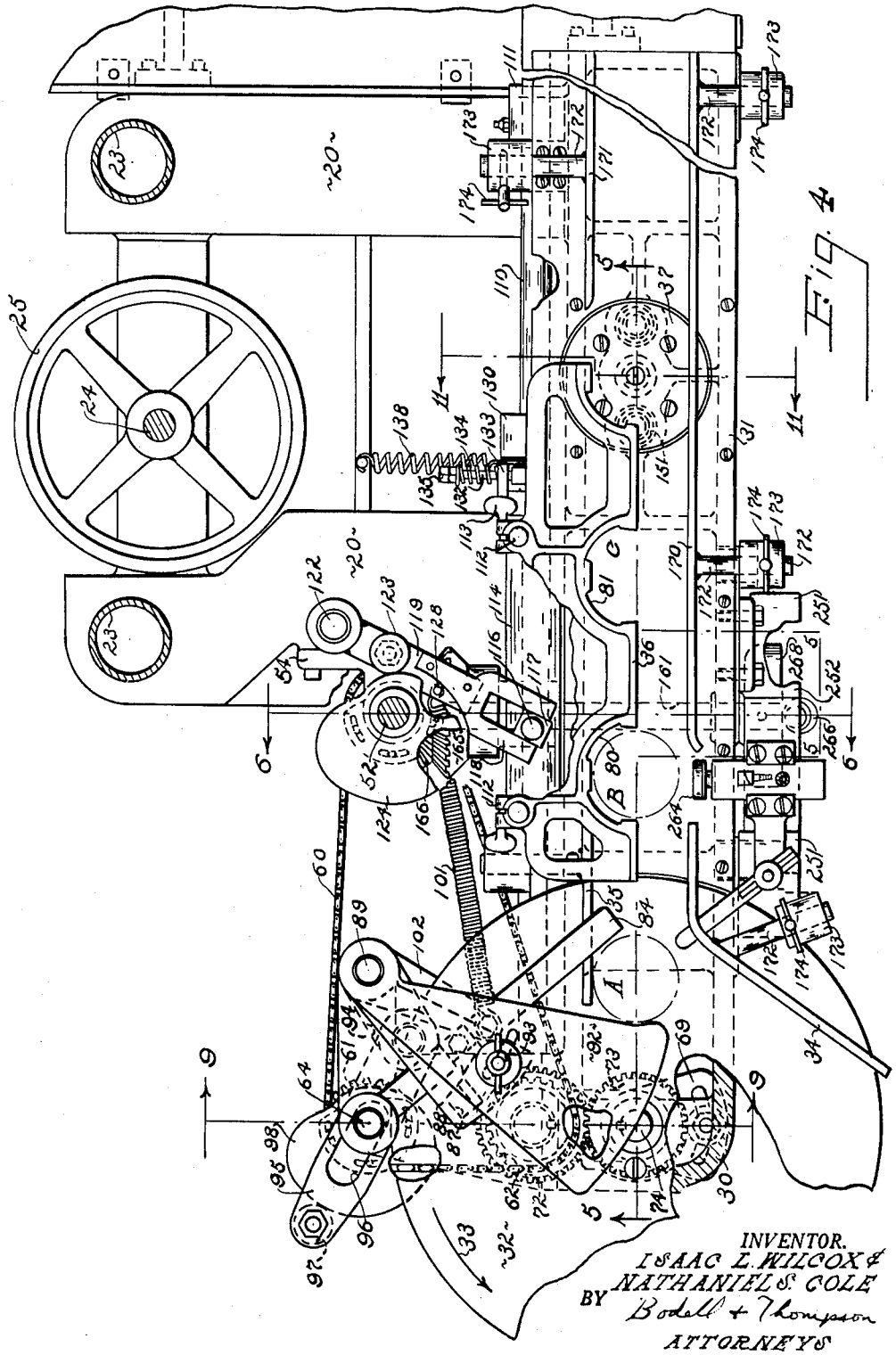
Figure 4 is a view taken on line 4—4, Figure 1.

The bottle advancing member 36 is formed with concavities 80, 81, and the forward end with a circular recess 82. The advancing member is moved inwardly over the guide rail plate 31, as shown in Figure 4, at which time there is a bottle positioned at B in registration with the concavity 80. The advancing member is then moved forwardly, or to the right Figure 4, moving that bottle to position C. The advancing member is then moved outwardly from the guideway 31 out of bottle engaging relation and then rearwardly or to the left the same distance that it advanced forwardly, and it is then moved inwardly over the bottle guideway and forwardly advancing the bottle from position C to the elevator 37, and simultaneously advancing a new bottle from position B to position C.

The accumulation of bottles on the table 32 are motivated between the guide rails 34, 35, until a bottle reaches position A at which time it engages an arm 84 pivotally mounted upon the upper end of the shaft 64. The arm 84 is provided intermediate its ends with a laterally extending projection 86, Figures 4, 9 and 10, which is normally maintained in engagement with a block 87 depending from the under side of an arm 88 which extends radially from a shaft 89 journalled vertically in the bracket 65 in spaced relation to the shaft 64. The arm 88 has a stud 90 extending upwardly through an arcuate slot 91 formed in a plate 92 which also extends radially from the shaft 89 over the in-feed table 32. The upper end of the stud is threaded to receive a lock nut 93. This structure permits adjustment of the plate 92 relative to the arm 88.

An arm 94 is fixed to the lower end of the shaft 89 and is pivotally connected to a link 95 formed with a slot 96 intermediate its ends for sliding engagement with the shaft 64, and having mounted at its outer end a roller 97 engaging a cam 98 fixed on the shaft 64. The cam 98 is mounted on a hub member 99 which is pinned to the shaft, and the cam 98 is adjustable by means of screws 100, as will be apparent. A coil tension spring 101 is secured at one end to an arm 102 fixedly secured to the shaft 89. The opposite end of the spring is attached to a lever hereinafter referred to. This spring functions to yieldingly urge the plate 92 in a counter-clockwise direction, Figure 4.

The arm 84 is normally rotated in a clockwise direction, Figure 4, by the frictional engagement of the arm with the upper end of the rotating shaft 64. This maintains the members 86, 87, in engagement and they form a latch to prevent the spring 101 from actuating the plate 92. When a bottle has been advanced by the rotating table 32 to the position A into engagement with the free end of the arm 84, the arm is moved in a counter-clockwise direction Figure 4, or in a clockwise direction in the bottom plan view Figure 10, thus disengaging the members 86, 87. This permits the spring 101 to actuate the plate 92 but because of the linkage 94, 95 and the cam 98, movement of the plate 92 can only be in timed relation to the rotation of the shaft 52. Movement of the plate 92 functions to advance the bottle from position A to position B. In position B, the bottle is in registration with the concavity 80 of the bottle advancing member 36, when the same has reached the limit of its return stroke, as shown in Figure 4. With this arrangement, each bottle is advanced in timed relation to the operation of the bottle advancing member 36.

The advancing member 36 is slidably mounted upon a rod 110 supported at its ends by brackets 111 attached to the base 20. The member 36 is detachably secured to posts 112, as by clamp screws 113. These posts extend upwardly from a casting 114 which is slidably mounted upon the rod 110 and which is provided, intermediate the posts 112, with a pin 116 on which is journalled a rectangular block 117 slidably mounted in the forked end portion 118 of a lever 119. The inner end of the lever 119 is pivotally mounted upon a stud 122 extending upwardly from the base 20 and a roller 123 is mounted intermediate the ends of the lever for engagement with a cam 124 mounted upon the shaft 52. One end of the spring 101, previously referred to, is attached to the lever 119, as at 128, this spring also serving to maintain the roller 123 against the periphery of the cam 124. With this arrangement, the bottle advancing member 36 is reciprocated lengthwise of the bottle guideway on the rod 110.

A collar 130 is slidably mounted upon the rod 110 and is formed with a radial projection 131 to which is secured an eye bolt 132 extending through a plate 133 attached to the member 114. A coil compression spring 134 is positioned on the bolt between the plate 133 and adjusting nuts 135, see Figures 4 and 11. The collar 130 has a depending arm 136, the lower end of which inclines inwardly, as at 137. A spring 138 functions to yieldingly rotate the collar 130 to move the bottle engaging member 36 outwardly to the dotted line position indicated at 140, Figure 11.

The bottle elevator 37 is mounted on the upper end of a shaft 142 mounted for vertical sliding movement in the casting 30. The lower end of the shaft is slotted to receive an actuating link 143, this connection being in the nature of a block 144 mounted on a pin 145, the block being engaged by the bifurcated end of the lever 143 which is pivotally mounted at its opposite end to a bracket 148 depending from the under side of the casting 30.

Figure 11:
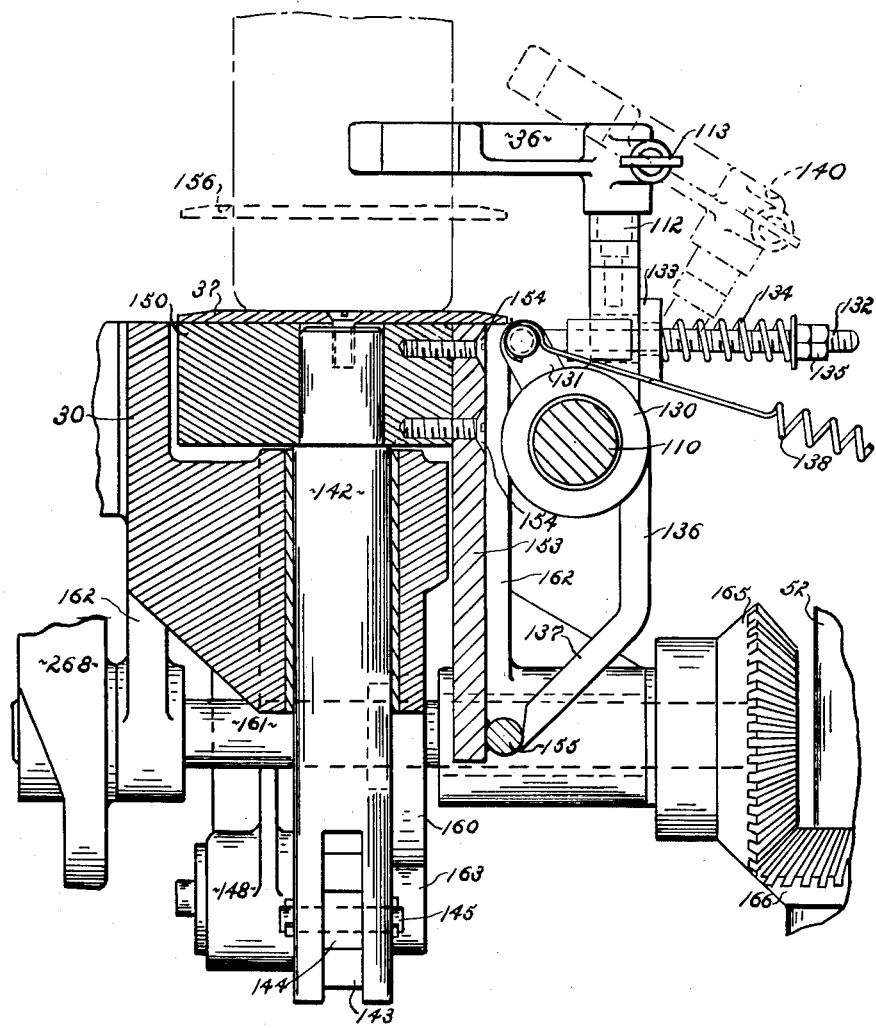
Figure 11 is a view taken on line 11—11, Figure 4.

The bottle elevating plate 37 is supported by a circular block 150 provided with apertures on opposite sides of the shaft 142 and in which are positioned coil compression springs 151, the lower portion of these springs being positioned in alined recesses formed in the bed casting 30. A plate 153 is attached to the block 150 as by screws 154, and has attached to its lower end a rod 155 extending parallel to the supporting rod 110. The arrangement is such that when the bottle elevator is moving downwardly to lowered position, as shown in Figures 1 and 11, the rod 155 engages the lower angular portion 137 of the arm 136, moving the collar 130 in a counterclockwise direction about the shaft 110. This movement effects a similar movement of the bottle engaging member 36 through the eye bolt 132 and spring 134. The purpose of the spring 134 is to prevent breakage of a bottle in the event the same is not positioned in registration with the concavities 80, 81, 82, as will be apparent. When the bottle elevator is moved upwardly to the dotted position indicated at 156, Figure 11, spring 138 effects inward movement of the carrier 36 to the dotted outline 140 in which position it will not engage bottles positioned on the guideway, and while in this position the member is moved rearwardly by the lever 119 and cam 124. As will be apparent, the reciprocation of the bottle advancing member and vertical movement of the bottle elevator are carried out in timed relation.

The springs 151 serve to yieldingly move the bottle elevator upwardly, this upward movement being permitted by a cam 160 mounted on a shaft 161 extending transversely below the bed casting 30 and being journalled in depending brackets 162. The periphery of this cam 160 is engaged by a roller 163 mounted intermediate the ends of the lever 143, see Figures 5 and 11. A miter gear 165 is affixed to the inner end of the shaft 161 and meshes with a similar gear 166 fixed to the shaft 52, all whereby the cam 160 is rotated in timed relation with the cam 124, whereby the parts just previously described are operated in timed relation.

It will be apparent that the mechanism described functions to intermittently advance a procession of bottles to the bottle elevator 37. During this advancement, the bottles are maintained in the concavities in the bottle advancing member by an outer guide rail 170. The bottle is advanced from the elevator 37 by engagement with the next preceding bottle advanced to the elevator, the advancing procession continuing along the guideway between the rail 170 and an inner rail 171. The guide rails 34, 170, 171, are formed with horizontally extending studs 172 slidably mounted in support members 173, whereby the rails can be adjusted laterally across the guideway for bottles of different diameters and fixed in adjusted position by clamping screws 174.

Figure 2:
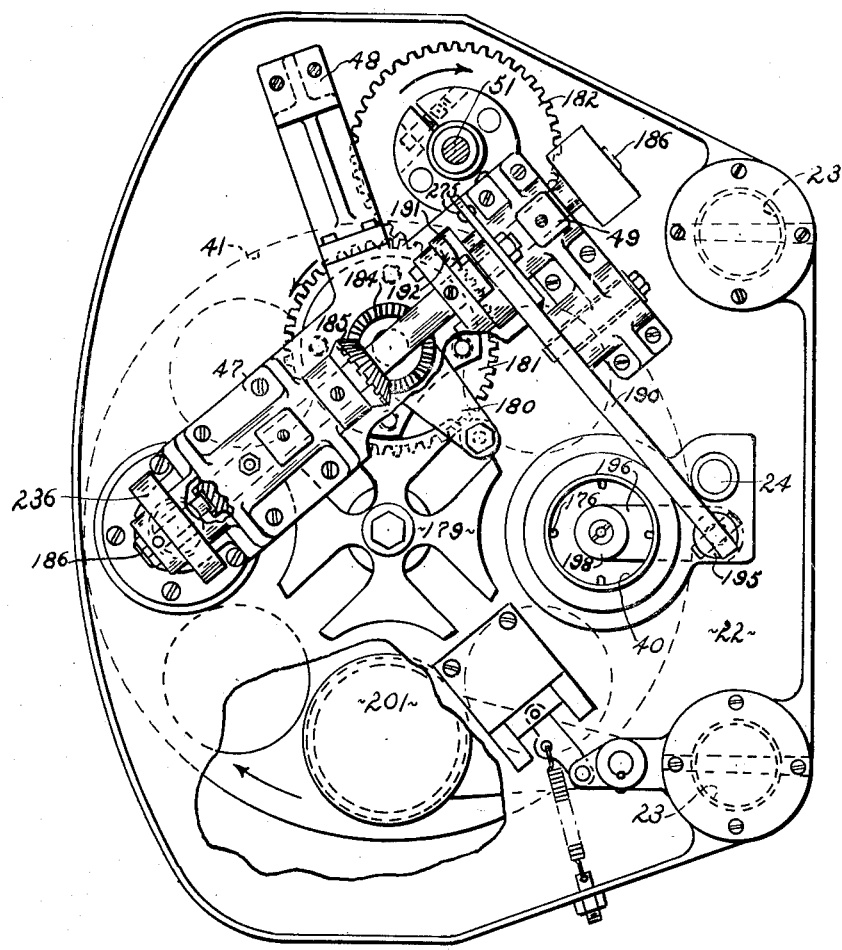
Figure 2 is a view taken on line 2—2, Figure 1.
Figure 3:
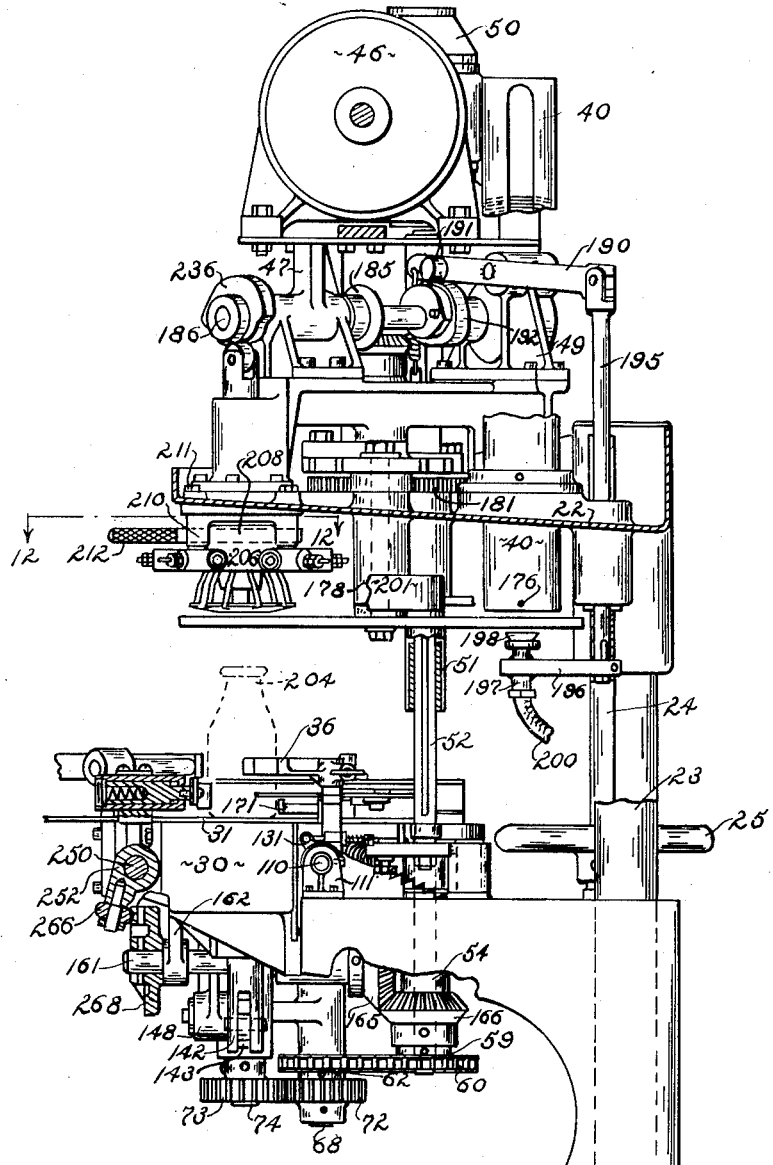
Figure 3 is an end elevational view with parts in section, looking toward the left, Figure 1.

As previously stated, the supply of caps 175 is arranged in stack formation in the tubular magazine 40, the lower end of this magazine being formed with a plurality of inwardly extending projections 176 to support the stack of caps. These caps are dished, or cupped, with their skirt portions extending downwardly, as shown in Figures 16, 17. The caps are withdrawn successively through the lower end of the magazine 40 and deposited in cap carrying members 177 carried by the disk 41. The disk 41 is mounted upon the lower end of a shaft journalled vertically in a boss 178 formed in the head casting 22, and the upper end of this shaft has a Geneva 179, the slots of which are engaged by a driving crank 180 mounted on a shaft journalled vertically in the head support 22 and to which there is affixed a gear 181 meshing with a gear 182 fixed to the motor output shaft 51. This vertical shaft, to which the crank 180 and gear 181 is mounted, has affixed to its upper end a miter gear 184 arranged in mesh with a similar gear 185 mounted on a horizontal shaft 186 journalled in bearing brackets 47, 49, Figures 2 and 3.

A lever 190 is pivotally mounted intermediate its ends to a portion of the bracket 49 and is provided at one end with a roller 191 engaging a cam 192 adjustably mounted on the shaft 186. The opposite end of the lever 190 is pivotally connected to a rod 195 slidably mounted for vertical movement in the head casting 22 and having affixed to its lower end an arm 196, see Figures 2, 3 and 16. A stem 197 is mounted on the arm 196 and carries a suction cup 198 of yieldable material, such as rubber, and which is positioned in registration with the magazine 40. The stem 197 is formed with a central passage 199 communicating with a hose 200. The cam 192 functions to effect vertical reciprocation of the cap transfer including the suction cup 198 to move the cup into engagement with the lowermost cap 175 and then downwardly to withdraw the cap from the magazine and deposit the same in the cap carrier 177 which is formed with a central aperture to permit vertical reciprocation of the cap transfer through the cap carrying member.

When a cap has been withdrawn from the magazine and deposited in the carrier 177 of disk 41, the disk is indexed by the Geneva 179 and crank 180 to position the cap underneath a cap heater 201. The timing of the machine is such that while the cap is being advanced from registration with the magazine 40 into registration with the cap heater 201, a bottle has been moved from position B to position C.

Figure 12:
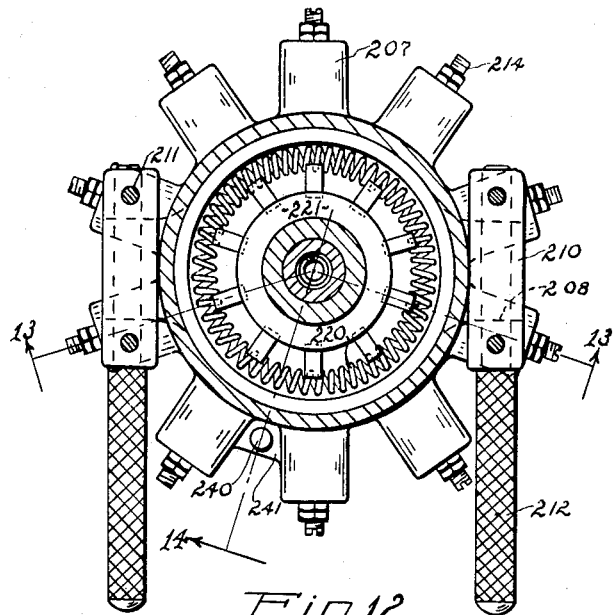
Figure 12 is a sectional view of the cap contracting head taken on line 12—12, Figure 3.

The disk 41 is then indexed to move the heated cap in registration with the cap applying head 43, this taking place while the bottle is advanced from position C to the elevator 37. The elevator is now moved upwardly by the structure previously described, moving the top of the bottle indicated in dotted outline at 204, Figure 3, through the cap carrying member 177 and moving the heated cap upwardly into the closing head 43. The closing head is disclosed particularly in Figures 12, 13 and 14.

The closing head consists of an annular member 206 formed with a plurality of radially extending bosses 207 and on opposite sides with elongated bosses 208. The upper end of the member 206 is machined cylindrically to fit into a similarly machined depending boss 209 formed on the support 22. A U-shaped bracket 210 is secured to the under side of the member 22, as by screws 211. The legs of the member 210 and the bosses 208 are apertured to receive pins 212. By this means, the annular member 206 is detachably secured to the supporting structure 22.

A plunger 213 is slidably mounted in each of the bosses 207. Each plunger has a stem 214 extending through a plug 215 threaded in the outer ends of the bosses, and a compression spring 216 is mounted upon each stem and interposed between the plunger 213 and the plug 215, whereby the plungers are yieldingly urged radially inwardly, see Figure 13. The inner ends of the plungers 213 form pivot points for an annular series of cap contracting fingers, each of which has a depending portion 217 to which a jaw member 218 is attached. The upper ends 219 of the fingers are encircled by a garter spring 220 which functions to move the upper ends 219 inwardly against a conical cam member 221 and move the jaws 218 outwardly from the axis of the head.

The cap contracting fingers are arranged in radially extending slots 222 formed in an insert 223 positioned in the lower end of the annular body member 206, the insert 223 being also formed with recesses 224 alined with the slots 222 and extending inwardly from its periphery. The inner ends of the plungers 213 are positioned in these recesses 224. The cam 221 has an upwardly extending stem portion 225 slidably mounted in a sleeve 226 secured to the top surface of the supporting member 22, as by screws 227. The stem 225 is formed with a central aperture in the lower portion of which there is slidably mounted a stem 228.

The insert 223 is formed with a central annular depending flange 229 having a bore in which the stem 228 is slidably mounted. The stem 228 is formed with an axially extending bore in which there is slidably mounted an inner stem 230 having a presser pad 231 at its lower end. The flange 229 and the stem 228 are formed with transverse apertures to receive a pin 232, and the lower portion of the inner stem 230 is formed with a slot 233 through which the pin 232 extends. The pin 232 serves to detachably secure the stem 228 to the body 206, and also serves to limit the downward movement of the pad 231 and to detachably retain the pad and the stem 230 in the stem 228. A compression coil spring 234 is positioned in the cam stem 225, the lower end of the spring acting against the upper end of the stem 228. This serves to urge the cam stem 225 upwardly to maintain the roller 235 against the cam 236 fixed on the end of the shaft 186. A similar spring 237 is positioned in the sleeve 228 and acts against the upper end of the stem 230 and a pin 238 extending transversely of the stem 228. This serves to yieldingly urge the pad 231 downwardly to the extent permitted by pin 232 and slot 233.

Figure 13:
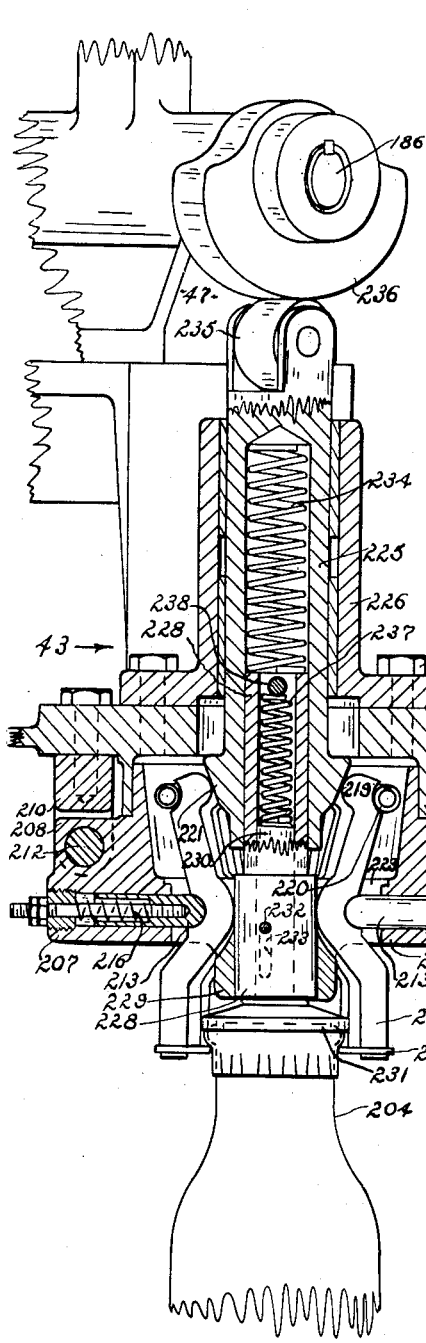
Figure 13 is a vertical sectional view of the capping head taken on line 13—13, Figure 12.
Figure 14:
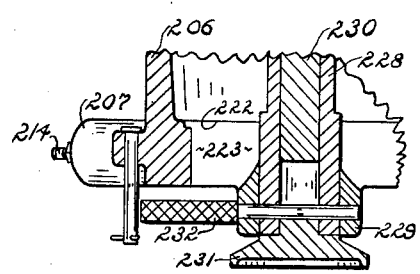
Figure 14 is a view taken on line 14—14, Figure 12.
Figure 15:
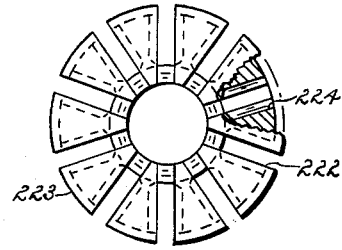
Figure 15 is a top plan view of the cap contracting finger spacing insert.

The actuating drive mechanism of the machine functions so that when a bottle is positioned on the elevator 37, a heated cap is positioned below the closing head and the elevator moves the bottle upwardly, moving the top of the bottle with the cap thereon through the annular series of jaws 218, the pad 231 being engaged by the central discoidal portion of the cap and being moved upwardly against the action of spring 237 to the position shown in Figure 13. Thereupon, the cam 236 moves the stem 225 downwardly, spreading the upper ends of the cap contracting fingers and moving the jaw portions 218 into engagement with the skirt of the cap. The cam 236 then permits the cam 231 to rise under the influence of the spring 234, spreading the jaws 218 by action of the spring 220, whereupon the elevator 37 descends returning the bottle in the plane of the bottle guideway 31.

Removal of the pins 212 permits removal of the closing head structure from the support 22. Removal of the pin 232 permits disassembly of the stems 228, 230, whereby the head and its various parts may be readily cleaned and sterilized. A pin 240 is slidably mounted in a boss 241 in register with the outer end of the pin 32 and serves to prevent accidental displacement of the pin 232.

It will be observed, in the head structure described, the cap contracting fingers are mounted for independent movement in that the pivot plungers 213 are free to move radially outwardly after the jaws 218 exert a predetermined pressure against the neck of the bottle. This arrangement effects the complete contraction of the overlapping pleated portions of the cap skirt regardless of any irregularities in the form or shape of the bottle top, and without any one finger exerting a pressure of such extent as would be likely to break or damage the bottle.

The shaft 186 is rotated continuously by the motor 46. This means that the cap transfer 198 is reciprocated vertically into and out of engagement with the lowermost cap of the magazine 40. Means is provided for applying vacuum to the cup 198 when it is desired to withdraw a cap from the magazine and deposit the same in the cap carrier 41.

A shaft 250 is journalled in bearing brackets 251 secured to the forward side of the bed casting 30. There is journalled on the shaft 250, for oscillation about the axis thereof, a member 252 having an outwardly and downwardly extending boss 253 and an upwardly extending portion 254 formed at its upper end with a slot extending in a direction transversely of the bottle guide and in which there is mounted a block 256 and which is retained therein by gib pieces 257 mounted on the portion 254, as by screws 258. The block is adjustable toward and from the guideway and is fixed in adjusted position by a set screw 259, see Figure 7. The block 256 is formed with a bore extending axially thereof and being of reduced dimension at its inner end. A plunger 260 is slidably mounted in this bore and is formed with a recess in which there is arranged a compression spring 261 acting against a plug 262 closing the outer end of the bore in the block 256. The inner end of the plunger 260 is of reduced diameter extending through the inner end wall of the block and is threaded to receive a stem 263, the outer end of which has an enlarged head portion 264. The block is positioned so that the head 264 is in alinement with the concavity 80 in the bottle advancing member 36 when the same is at the end of its return stroke, as shown in Figure 4.

The boss 253 is formed with an aperture in which there is mounted a stud 265 and on the outer end of which there is journalled a roller 266, see Figures 7 and 8. This roller engages a face cam 268 mounted upon the outer end of the shaft 161. The roller is maintained against the cam by a tension spring 269. The cam 268 functions to rock the member 252 about the axis of the shaft 250, causing the block 256 to move toward and from the bottle guideway 31. The arrangement is such that when a bottle is arranged in position B in the concavity 80, the cam 268 causes the head member 264 to move inwardly into engagement with the bottle. Continued inward movement of the block 256 by the cam brings an aperture 270 in the side wall of the member 260 in registration with the aperture in a hose fitting 271, to which the hose 200 is connected. The block 256 is formed adjacent its outer end with a threaded aperture to receive a fitting 272 which is connected to a vacuum pump 273 operated by the motor 46, see Figure 1.

With the plunger 260 in the position shown in Figure 8, to which it has been moved by engagement with a bottle, vacuum is applied to the cap transfer cup 198. This operation takes place during the dwell of the bottle advancing member 36 and the arrangement of the cam 268 is such as to maintain the vacuum until the transfer cup 198 has transferred a cap from the magazine 40 and deposited it in one of the cap holders 177, whereupon the cam 268 permits the spring 269 to swing the block 256 outwardly and, as the head 264 is moved away from the bottle, the spring 261 moves the plunger 260 inwardly, moving the passage 270 out of registration with the fitting 271, shutting off the vacuum. The purpose of this arrangement is to prevent the cap transfer from withdrawing a cap from the magazine when there will be no bottle in the advancing procession to receive the cap. It will be noted that the cap-call mechanism just described is located two stations in advance of the bottle elevator 37 where the caps are sealed to the bottle tops by the closing head structure 43, and that the cap magazine 40 is likewise located two stations remote from the applying head so that as each bottle enters the guideway at position B, it calls for a cap and that cap is applied to the top of that bottle.

The roller 191 on the cap transfer actuating link 190 is maintained in engagement with the periphery of the cam 192 by a tension spring 275, Figure 16, this spring serving to elevate the cap transfer 98 and the cam 192 acting to move it downwardly. The caps 175 are formed with their annular skirt portions 276 flared or depending downwardly, and are stacked in this relation in the magazine 40, see Figure 17. When the suction cup 198 is moved upwardly into engagement with the lowermost cap, as illustrated in Figure 17, and then moved downwardly, the cap is withdrawn from the magazine over the abutments 176, with the result that the cap is dished in the opposite direction with the skirt portion 276 now extending upwardly, as shown in Figure 18. The cam 192 rotates in the direction of the arrow 277 and when the low surface 278 engages the roller 191, the suction cup 198 is moved upwardly into engagement with the cap, as shown in Figure 17. The next adjacent higher portion 279 of the cam effects downward movement of the cup 198 sufficiently to withdraw the cap from the magazine, as shown in Figure 18. The periphery of the cam has an adjacent lower surface 280 which effects return upward movement of the cup 198 sufficiently to move the central portion of the cap upwardly while the peripheral edge of the cap is in engagement with the under sides of the abutments 176. This effects a recupping of the cap with the skirt portion 276 again depending from the central portion of the cap, as illustrated in Figures 19, 20. The elongated high portion of the cam 281 then effects complete downward movement of the suction cap a sufficient distance to deposit the cap in the carrier 177 with the skirt portion 276 of the cap depending for proper application to the bottle top. This arrangement permits the caps to be stacked right side up in the magazine 40.

What we claim is:

1. A capping head for applying hood caps to bottles comprising a body member, an annular series of cap engaging and contracting fingers arranged in the body and depending therefrom, an annular series of pivot members mounted in the body for movement radial of said annular series of fingers, each of said fingers being pivotally mounted intermediate its ends to a corresponding one of said pivot members, cam means cooperable with the upper ends of said fingers to effect outward radial movement thereof and inward radial movement of the lower portions of said fingers, and means yieldingly urging said pivot members toward the axis of said annular series of fingers.

2. A cap applying head for applying paper hood caps to bottles comprising a body, an annular series of cap engaging fingers arranged in the body and depending therefrom, an annular series of pivot members mounted in the body for movement toward and from the axis of said annular series of fingers, each of said fingers being pivotally mounted intermediate its ends to a corresponding one of said pivot members, spring means associated with each of said pivot members and being operable to yieldingly urge said members toward the axis of the body, means cooperable with each pivot member for adjusting the inward movement thereof, and cam means cooperable with the upper ends of the fingers for moving the same outwardly about said pivot members.

3. A cap applying head for applying paper hood caps to bottles comprising a body, an annular series of cap engaging fingers arranged in the body and depending therefrom, an annular series of pivot members mounted in the body for movement toward and from the axis of said annular series of fingers, each of said fingers being pivotally mounted intermediate its ends to a corresponding one of said pivot members, spring means associated with each of said pivot members and being operable to yieldingly urge said members toward the axis of the body, means cooperable with each pivot member for adjusting the inward movement thereof, and cam means movable axially of said body into engagement with the upper ends of said fingers for moving the same about said pivot members.

4. A bottle capping machine comprising a base, a bottle guideway mounted on the base, a frame mounted on the base and overhanging said guideway, a cap applying head mounted on said frame and positioned above the guideway, a cap magazine mounted on the frame for supporting a supply of caps in stack formation, a turret journalled in the frame on a vertical axis located intermediate said head and said magazine, a cap heater mounted on the frame, said turret being rotatable in a horizontal plane below said head, cap magazine and heater, said turret being formed with a plurality of circumferentially spaced apart apertures in its peripheral portion, said apertures being spaced complemental to the spacing between said magazine, heater and head, a cap transfer member mounted on the frame and being movable upwardly through the turret into engagement with the lowermost cap in said stack and downwardly to transfer said cap onto the turret, motion transmitting means for operating said cap transfer member and indexing said turret in timed relation for the transfer of a cap from the magazine in registration with the heater and thence in registration with said head, and a bottle elevator operable to move a bottle top upwardly through the turret into said head, and said head being operable to apply a heated cap positioned on the turret to the bottle top.

5. A bottle capping machine comprising a base, a bottle guideway mounted on the base, a frame mounted on the base and overhanging said guideway, a cap applying head on said frame positioned above the guideway, a cap carrying turret journalled in said frame on a vertical axis and having a portion overhanging said guideway, a cap magazine mounted on the frame above said turret for positioning a vertical stack of caps, a cap heater mounted on the frame above the turret, the axis of said turret being located between said head and said magazine, and said heater being positioned intermediate said head and magazine, said turret being formed with a series of apertures, each encircled by a cap carrying recess formed in the top surface of the turret, said apertures and recesses being located in the marginal portion of the turret and being spaced apart circumferentially of the turret for registration with the magazine, heater and said head respectively, a cap transfer member normally positioned below the turret in registration with said magazine and being movable upwardly through the aperture in the turret in registration with the magazine into engagement with the lowermost cap in said stack and downwardly to transfer a cap from the magazine into the recess encircling said aperture, bottle advancing means operable to intermittently advance bottles along said guideway successively in registration with said head, and motion transmitting means operable to effect intermittent indexing of said turret to advance caps deposited thereon by said cap transfer member into registration with the heater and thence in registration with said head, reciprocation of said cap transfer, and operation of said bottle advancing means in timed relation, and a bottle elevator positioned in the guideway in registration with said head for vertical reciprocation and operable to move a bottle upwardly and the top of the bottle through an aperture in the turret and into said head, and said head being operable upon such elevation of a bottle to apply the cap positioned in the recess associated with said last mentioned aperture to the top of the bottle.

6. A capping head for applying flexible hood caps to bottles comprising an annular body, a circular series of plungers mounted in the body in a common plane, said plungers being individually slidably mounted in the body for radial movement toward and from the axis thereof, an annular series of cap engaging fingers mounted in the body and depending therefrom, each of said fingers having a pivotal connection intermediate its ends with a corresponding one of said plungers, and means yieldingly urging said plungers inwardly toward the axis of said annular series of fingers.

References Cited in the file of this patent

UNITED STATES PATENTS

| | | |
|---|---|---|
| 1,434,415 | Taylor | Nov. 7, 1922 |
| 1,503,521 | Strandt | Aug. 5, 1924 |
| 1,679,939 | Maw | Aug. 7, 1928 |
| 2,076,116 | Brinton | Apr. 6, 1937 |
| 2,087,251 | Gough | July 20, 1937 |
| 2,118,710 | Lowry | May 24, 1938 |
| 2,204,594 | Hogg | June 18, 1940 |
| 2,295,049 | Pityo | Sept. 8, 1942 |
| 2,310,868 | Price | Feb. 9, 1943 |
| 2,325,164 | Goodwin | July 27, 1943 |
| 2,349,523 | Sonnenberg | May 23, 1944 |
| 2,416,001 | Goodwin | Feb. 18, 1947 |